(12) United States Patent
Turner et al.

(10) Patent No.: US 10,871,124 B2
(45) Date of Patent: Dec. 22, 2020

(54) COATED VALVE SEAT REGION OF AN INTERNAL COMBUSTION ENGINE

(71) Applicant: Ford Global Technologies, LLC, Dearborn, MI (US)

(72) Inventors: Paul Nigel Turner, Chelmsford (GB); Bas van den Heuvel, Wijnandsrade (NL); Richard Fritsche, Wermelskirchen (DE); Clemens Maria Verpoort, Monheim am Rhein (DE); Andreas Wank, Luckenbach (DE); Frank Beck, Bad Marienberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/527,097

(22) Filed: Jul. 31, 2019

(65) Prior Publication Data

US 2020/0040840 A1 Feb. 6, 2020

(30) Foreign Application Priority Data

Aug. 2, 2018 (DE) .................. 10 2018 212 908

(51) Int. Cl.
*B32B 15/01* (2006.01)
*F02F 1/24* (2006.01)
*C22C 21/02* (2006.01)
*B23K 26/342* (2014.01)

(52) U.S. Cl.
CPC .............. *F02F 1/24* (2013.01); *B23K 26/342* (2015.10); *B32B 15/016* (2013.01); *C22C 21/02* (2013.01); *B32B 2250/03* (2013.01); *B32B 2255/06* (2013.01); *B32B 2255/205* (2013.01); *B32B 2307/732* (2013.01); *B32B 2605/00* (2013.01); *F02F 2200/00* (2013.01)

(58) Field of Classification Search
CPC .. B23K 2103/10; B23K 26/34; B32B 15/016; B32B 2255/205; C22C 21/02; F02F 1/24; F02F 2200/00; F01L 3/04; C23C 26/02; F02D 9/107
See application file for complete search history.

(56) References Cited

U.S. PATENT DOCUMENTS

| | | | | |
|---|---|---|---|---|
| 3,165,823 A * | 1/1965 | Rowady | ............... | C23C 4/08 428/652 |
| 3,338,733 A * | 8/1967 | Rowady | ............... | C23C 10/28 148/526 |
| 4,723,518 A * | 2/1988 | Kawasaki | ............... | F01L 3/22 123/188.3 |

(Continued)

*Primary Examiner* — George C Jin
*Assistant Examiner* — Teuta B Holbrook
(74) *Attorney, Agent, or Firm* — Burris Law, PLLC

(57) ABSTRACT

At least one coated valve seat region has at least one first layer and a second layer, the second layer is arranged on the first layer, and the first layer and the second layer are different. The first layer and the second layer are each formed by a local thermal deposition welding method. In the case of a cylinder head of an internal combustion engine, a valve seat region is formed by depositing a first layer on a substrate material of the valve seat by a laser deposition welding method in one method step and, in a subsequent method step, depositing a second layer on the first layer by a laser deposition welding method. The second layer contains a material which exerts a material hardening effect.

20 Claims, 2 Drawing Sheets

(56) References Cited

U.S. PATENT DOCUMENTS

| | | | | |
|---|---|---|---|---|
| 5,692,726 A | * | 12/1997 | Adachi | B22F 7/062 |
| | | | | 123/188.3 |
| 5,742,020 A | * | 4/1998 | Adachi | F01L 3/22 |
| | | | | 219/118 |
| 7,431,881 B2 | | 10/2008 | Mazumder | |
| 2010/0313842 A1 | * | 12/2010 | Song | F01L 3/22 |
| | | | | 123/193.5 |
| 2011/0239858 A1 | | 10/2011 | Slot et al. | |
| 2016/0311071 A1 | | 10/2016 | Dutta | |
| 2018/0345404 A1 | * | 12/2018 | Hasegawa | G02B 27/30 |

\* cited by examiner

COATED VALVE SEAT REGION OF AN INTERNAL COMBUSTION ENGINE

CROSS-REFERENCE TO RELATED APPLICATIONS

This application claims priority to and the benefit of German patent Application No. 102018212908.8 filed on Aug. 2, 2018. The disclosure of the above application is incorporated herein by reference.

FIELD

The present disclosure relates to a cylinder head of an internal combustion engine composed of a substrate material having at least one coated valve seat, wherein the at least one coated valve seat region has been formed by a local thermal deposition welding method.

BACKGROUND

The statements in this section merely provide background information related to the present disclosure and may not constitute prior art.

In the case of some technical devices, it is desired for parts of the surface to have a particular hardness. This is due to the fact, for example, that two machine parts slide past one another in this region (e.g. shaft bearings) or that two machine parts must repeatedly come into contact and then move away from one another again as a result of their functioning. The last-mentioned "repeatedly bring into contact with one another" can also lead to repeated impact between the two parts when speeds are relatively high. It will be easily appreciated that, in such cases, the relevant component regions should be made particularly hard to provide that premature wear does not occur.

In principle, of course, it is possible to manufacture the entire workpiece from a particularly hard material or to coat it (substantially) completely with a particularly hard layer. Although this represents a feasible option from a technical point of view, such an approach generally makes little sense economically owing to the associated costs.

One example of the subject area mentioned is that of internal combustion engines in motor vehicles. In this case, the valve seats of inlet valves and exhaust valves of the combustion chambers of the engine may be mentioned, in particular. Since such internal combustion engines are operated at relatively high speeds, the valves must open and close with corresponding rapidity and impact between the valves and the associated valve seats is therefore unavoidable.

Moreover, there are increasing requirements on the valve seats of internal combustion engines from an environmental point of view. This is due to the fact that, for reasons connected with the environment, there is a requirement that the fuels should contain less and less additives or less and less suitable additives which could be helpful in respect of the impact between the valves and the valve seats. Whereas leaded gasoline was used in the motor vehicle sector a few decades ago, such fuels can now be obtained only with difficulty—if at all—or the relevant additives have to be added by the operator.

The problem is additionally made more acute by the fact that increasing use is supposed to be made of alcohol-based fuels or that the alcohol content of fuels is supposed to rise. This has the effect that many techniques for the formation of sufficiently hard valve seats increasingly lead to problems.

To solve the problem, there has been a proposal, for example, to mill a groove out of the cylinder head in the region of the valve seat. A metal ring composed of a particularly durable metallic material is then inserted into the groove. This procedure provides quite practical results. However, the relatively high manufacturing outlay is problematic. In particular, it has proven problematic to provide permanently secure seating of the rings in the groove provided. This is often achieved in the prior art by exposing the metal ring to be used to low temperatures (e.g. liquid nitrogen) and inserting the ring into the groove in the cold state. Owing to thermal expansion, the metal ring jams firmly in the groove at room temperature, and especially at the operating temperature of the engine. An increasing problem with this technology is to the effect that material is lost from the ring or along the groove over time due to corrosion phenomena (pitting of the material) and the ring can come loose at a certain point in time. This is a problem particularly with alcoholic (methanol or ethanol) or alcohol-containing fuels.

Another proposal is to deposit a thin layer of material of particularly durable material in the region of the valve seat. For this purpose, the general practice is to use a locally limited thermal energy input, e.g. by means of a laser beam. Corresponding layers and coating methods are disclosed in U.S. Pat. No. 7,431,881 B2 or in US 2016/0311071 A1, for example. Although the deposition of a coating by local melting by means of laser beams (also referred to as laser cladding) represents a certain outlay, there is a major advantage in the fact that—unlike the case with material rings inserted in a groove—the material layer is metallurgically bonded and is thus to a certain extent "captive". However, one significant problem is that, with the laser cladding methods, the layer formed depends to a relatively great extent on the material of the actual workpiece. The degrees of freedom in respect of the materials that can be used for the coating are correspondingly restricted.

SUMMARY

The present disclosure provides a cylinder head of an internal combustion engine composed of a substrate material having a coated valve seat which is improved over valve seats of the same type known in the prior art. The present disclosure also provides a method for forming a coated valve seat region on a cylinder head of an internal combustion engine.

It should be noted that the features and measures presented individually in the following description can be combined in any technically feasible manner, giving rise to further forms or variations of the present disclosure. The description additionally characterizes and specifies the present disclosure, particularly in conjunction with the figures.

In one form of the present disclosure, a cylinder head composed of a substrate material having at least one coated valve seat is provided. The at least one coated valve seat is formed by a local thermal deposition welding method. Furthermore, the at least one coated valve seat, which can also be referred to as a surface region, has at least one first layer and also a second layer in addition. In this case, the second layer is arranged on the first layer. In one form, the first layer and the second layer are different materials. In one variation, the first layer and the second layer are deposited by a local thermal deposition welding method. In the case of two-layer coatings, two different layers situated one above the other are provided at least in some regions. This makes it possible for a relatively large difference in materials, especially between the substrate material and the second layer, to be achieved without damage. On the one hand, this is due to the fact that less change can occur in the material per unit length owing to the interposed first layer. Moreover, the first layer too can act as a kind of buffer layer, thus enabling materials which are incompatible per se (at least to a certain extent) in the substrate material and the second layer nevertheless to be joined together by virtue of the interposed first layer, namely "indirectly".

A "layer" (particularly the first layer and/or the second layer) is typically taken to mean a material region, the extent of which along a surface (i.e., a length and/or width) is significantly greater than the thickness thereof. To name one typical size ratio: surface areas in the region of 1 $cm^2$ and above are typically combined with thicknesses of 1 mm or less (for an individual layer). It is furthermore possible for the first layer and the second layer to have a similar extent in terms of area. On the contrary, it is possible for the second layer to have an area which is smaller than the area of the first layer. It is thereby possible to a certain extent to provide a kind of margin to enable material incompatibilities between the substrate material and the material of the second layer to be reduced in a particularly effective manner. In addition or as an alternative, however, it is also possible for the second layer to extend beyond the region of the first layer (in some region or regions), allowing direct material contact between the second layer and the substrate material. This is not necessarily disadvantageous. On the contrary, such contact may even be advantageous for reasons connected with strength, for example, or for other reasons.

Where mention is made of the fact that the first layer and the second layer are different, this relates especially to the material of the layer(s) concerned. In particular, it is possible for at least partially different materials to be present or, in the case of an alloy or of a mixture of materials in a layer, for material components to be present which are not present in the other layer and vice versa. In addition or as an alternative, however, it is also possible that, although fundamentally the same materials are present in the first layer and the second layer, the quantitative proportions of the material constituents differ between the first layer and the second layer. It is furthermore also possible that, in addition or as an alternative, the material properties are different, that is to say, for example, the grain sizes of included materials are different, the crystal structures are different and the like (in particular also partially). Although, in the present case, it is differences between the first and the second layer which are referred to, the same differences can occur, at least analogously, between the substrate material and the first layer or between the substrate material and the second layer.

A local thermal deposition welding method should be taken to mean, in particular, a method in which a significant increase in temperature which is locally very limited (typically in the manner of a point/points) is achieved by suitable methods. In particular, the locally limited thermal energy input leads to local thermal softening and/or local melting in a locally very limited region.

It is advantageous if at least one of the thermal deposition welding methods is a laser deposition welding method. Laser deposition welding methods (laser cladding methods) of this kind are known in the prior art and have also proven to be practicable in series production. Thanks to the experience obtained with these methods, the processes can be carried out safely. It is also advantageous if, in the case of at least one of the thermal deposition welding methods, the material to be fed in is fed in powder form and/or in wire form. One advantage with feeding in material in this way is that the material to be fed in can be fed in a relatively simple manner and can still be fed in a variable way, even during the actual deposition welding method.

It is furthermore not necessary that the local thermal deposition welding method for the first layer should be the same local thermal deposition welding method as that for the second layer, although that is, of course, possible or preferred.

It is furthermore advantageous if the substrate material comprises aluminum or an aluminum alloy. In particular, this can be an aluminum alloy with a proportion of silicon. The materials mentioned combine relatively high strength with a good service life, good machinability and especially also low weight. In the motor vehicle manufacturing sector, attention may furthermore be drawn here specifically to use for engines, specifically internal combustion engines. In the case of an aluminum alloy with a proportion of silicon, this can be, in particular, a proportion of silicon in a range (in weight %) between about 6% and about 12%, for example between about 7% and about 10%, or between about 8% and about 9%. In one form of the present disclosure the substrate material comprises an aluminum alloy with about 9%.

It is furthermore provided that the material of the first layer is based on the substrate material but has a modified material weighting. In particular, the material of the first layer can be an aluminum alloy with an increased proportion of silicon. Here, the modification relates particularly to comparison with the substrate material but, where appropriate, it can also additionally or alternatively relate to a comparison with the second layer. Material weighting should be taken to mean, in particular, that the proportions by quantity, proportions by volume or proportions by weight of the substances used in the material or mixture of materials of the substrate material and of the first layer (where applicable additionally and/or alternatively also the second layer) are modified. On the one hand, this can be due to the fact that the proportions shift without an additional material being added or without material continuing to be added. However, it is also equally possible for the modified proportions to result from the fact that an additional substance is added or is no longer added. "Based on the substrate material" should be taken to mean, in particular, that the modification of the material weighting takes place within a relatively narrow range, typically in the region of a few percentage points (that is to say, in particular, less than or equal to 1, 2, 3, 4, 5, 6, 7, 8, 9 or 10 percentage points). In the case of an aluminum alloy with an increased proportion of silicon, the proportion of silicon can be, in particular, between about 10% and about 15%, for example between about 11% and about 14%, or between about 13% and about 14%. In one form, the increased proportion of silicon is about 12%.

In one form, in the valve seat region, the material of the second layer is based on the material of the first layer but has a modified material weighting wherein, in particular, the material of the second layer contains a material which exerts a material-hardening effect. It is thereby possible to increase the service life of the workpiece at high loads in a simple manner. In one form, the material which exerts a material-hardening effect is a carbide material component (e.g., niobium carbide, boron carbide, silicon carbide, vanadium carbide, tungsten carbide—which comprises both fused tungsten carbides, including spheroidized fused tungsten carbides and tungsten monocarbide or WC/Co- or WC/Ni-based hard metal composites). In this case—as mentioned—the material of the second layer is based on the material of the first layer and hence generally also indirectly on the substrate material. In another form, the second layer comprises an aluminum alloy with an increased proportion of silicon, the increased portion of silicon exerts a material-hardening effect, and the increased portion of silicon is admixed with the aluminum alloy of the second layer. In such a form the proportion of silicon is between about 40% and about 50%, for example between about 41% and about 48%. In one form the proportion of silicon is about 42%. The material which exerts a material-hardening effect can also be admixed to the first layer, in which case it would be possible to dispense with the deposition of the second layer. However, the deposition of the second layer is also possible if the first layer contains the material which exerts a material-hardening effect.

It is furthermore provided that the first layer and/or the second layer has/have a material thickness of between about 200 μm and about 1000 μm, for example between about 300 μm and about 800 μm, or between about 400 μm and about 600 μm. In one form, the first layer and/or the second layer has/have a material thickness of about 500 μm. Such layer thicknesses both of the first and of the second layer have proven particularly advantageous in initial trials. Typically, the selected material thicknesses of the first layer and the second layer are approximately equal. However, it is likewise possible for different material thicknesses to be selected. This can furthermore apply not only in the case of a single coated surface region in respect of the first and the second layer but, in particular, can also apply to the ratio of two different surface regions to one another.

It is particularly worthwhile if the first layer is designed as an adhesion-promoting layer between the substrate material and the second layer. In this case, the second layer can be improved to a particularly great extent for its function as a "hard layer" without excessive attention having to be paid to a good adhesion effect on the substrate material (or to any other material incompatibility). In contrast, the first layer is chosen in such a way that it has as high as possible, in particular a similarly high, adhesion effect both in relation to the substrate material and in relation to the second layer.

Thus, it is provided that at least one of the coated surface regions is provided in the region of a valve seat. With such use, the coating can develop its properties and advantages in a special way. In this way, the present disclosure makes available a cylinder head of an internal combustion engine composed of said substrate material having at least one coated valve seat, which has a hardness of 380 to 520 HV0.3, and is free from cracks and attachment defects.

In particular, the internal combustion engine can be an internal combustion engine for a motor vehicle.

In one form of the present disclosure, an aluminum alloy cylinder head (i.e., a cylinder head formed from an aluminum alloy) of an internal combustion engine includes at least one coated valve seat region formed by a local thermal deposition welding method. The at least one coated valve seat region has a first layer and a second layer. The second layer is arranged on the first layer, the first layer is formed from a first aluminum alloy that is different than the aluminum alloy of the cylinder head, and the second layer is formed from a second aluminum alloy that is different than the first aluminum alloy. Also, the second aluminum alloy of the second layer exerts a material-hardening effect. In one variation, the first layer and the second layer are laser clad layers. The aluminum alloy of the cylinder head contains silicon, for example, about 9 wt. % silicon, and the first aluminum alloy contains more silicon than the aluminum alloy of the cylinder head, for example, more than about 9 wt. % silicon. In at least one variation of the present disclosure, the first aluminum alloy contains about 12 wt. % silicon.

The second aluminum alloy contains at least one material that exerts the material hardening effect. In one variation, the at least one material is at least one of niobium carbide, boron carbide, silicon carbide, vanadium carbide, tungsten carbide, fused tungsten carbides, spheroidized fused tungsten carbides and tungsten monocarbide, WC/Co-based hard metal composites and WC/Ni-based hard metal composites. In another variation, the at least one material that exerts the material hardening effect is between about 40% and about 50% silicon, for example between about 41% and about 48% silicon. In at least one variation, the at least one material is about 42% silicon.

At least one of the first layer and the second layer has a material thickness between about 200 μm and about 1000 μm, for example between about 300 μm and about 800 μm. In one variation of the present disclosure, at least one of the first layer and the second layer has a material thickness of between about 400 μm and about 600 μm.

In another form of the present disclosure, an internal combustion engine includes a cylinder head formed from an aluminum alloy and with at least one coated valve seat region formed by a local thermal deposition welding method. The at least one coated valve seat region has a first layer and a second layer, the second layer is arranged on the first layer, and the first layer is formed from a first aluminum alloy that is different than the aluminum alloy of the cylinder head and the second layer is formed from a second aluminum alloy that is different than the first aluminum alloy. The second aluminum alloy of the second layer exerts a material-hardening effect. In one variation first layer is formed from an aluminum alloy with an increased proportion of silicon in relation to the aluminum alloy of the cylinder head. In one non-limiting example, the first aluminum alloy contains more than about 9 wt. % silicon. In at least one variation of the present disclosure, the second aluminum alloy has an increased proportion of silicon than the aluminum alloy of the cylinder head and at least one of niobium carbide, boron carbide, silicon carbide, vanadium carbide, tungsten carbide, also including fused tungsten carbides, both spheroidized tungsten carbides and tungsten monocarbide or WC/Co- or WC/Ni-based hard metal composites. In at least one other variation, the second aluminum alloy contains between about 40% and about 50% silicon and the silicon between about 40% and about 50% exerts the material hardening effect.

In still another form of the present disclosure, a method for forming a coated valve seat region on an aluminum alloy cylinder head of an internal combustion engine includes depositing a first layer on the cylinder head using local thermal deposition welding and depositing a second layer on the first layer using local thermal deposition welding. The first layer is formed from a first aluminum alloy that is different than the aluminum alloy of the cylinder head and the second layer is formed from a second aluminum alloy that is different than the first aluminum alloy. Also, the second aluminum alloy of the second layer exerts a material-hardening effect. In one variation, the first layer is formed from an aluminum alloy with an increased proportion of silicon in relation to the aluminum alloy of the cylinder head. One non-limiting example includes the aluminum alloy of the cylinder head containing about 9 wt. % silicon and the first aluminum alloy containing more than about 9 wt. % silicon.

In at least one variation, the second aluminum alloy has an increased proportion of silicon compared to the aluminum alloy of the cylinder head and at least one material that exerts the material hardening effect selected from niobium carbide, boron carbide, silicon carbide, vanadium carbide, tungsten carbide, also including fused tungsten carbides, both spheroidized tungsten carbides and tungsten monocarbide or WC/Co- or WC/Ni-based hard metal composites. In at least one other variation, the at least one material that exerts the material hardening effect in the second aluminum alloy is between about 40% and about 50% silicon.

In one form, the substrate material, that is the surface region to be coated, e.g., the valve seat region, is prepared before the deposition of the first layer by suitable measures. For example, a planar surface in the valve seat region is provided by shaping or machining. And after one layer or, preferably, both layers have been deposited, the valve seat is finish-machined, e.g. by grinding.

The method (both "in isolation" and together with suitable refinements) can then have the advantages and characteristics described above, at least in analogous fashion. Refinement in accordance with the above proposals is, of course, possible, at least analogously, and is in general advantageous.

In this context, the two method steps of the local thermal deposition welding method can be carried out at longer or shorter time intervals. Typically, it is sufficient if the second method step is carried out when the first layer has substantially reached the solid state of aggregation again. A certain residual ductility owing to residual heating is not necessarily deleterious here. It is likewise also possible to wait before the second method step until the temperature of the workpiece has fallen to a large extent/substantially to room temperature, at least in the region of the surface region to be coated (although a residual temperature of, for example, 50° C. or less is also possible).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
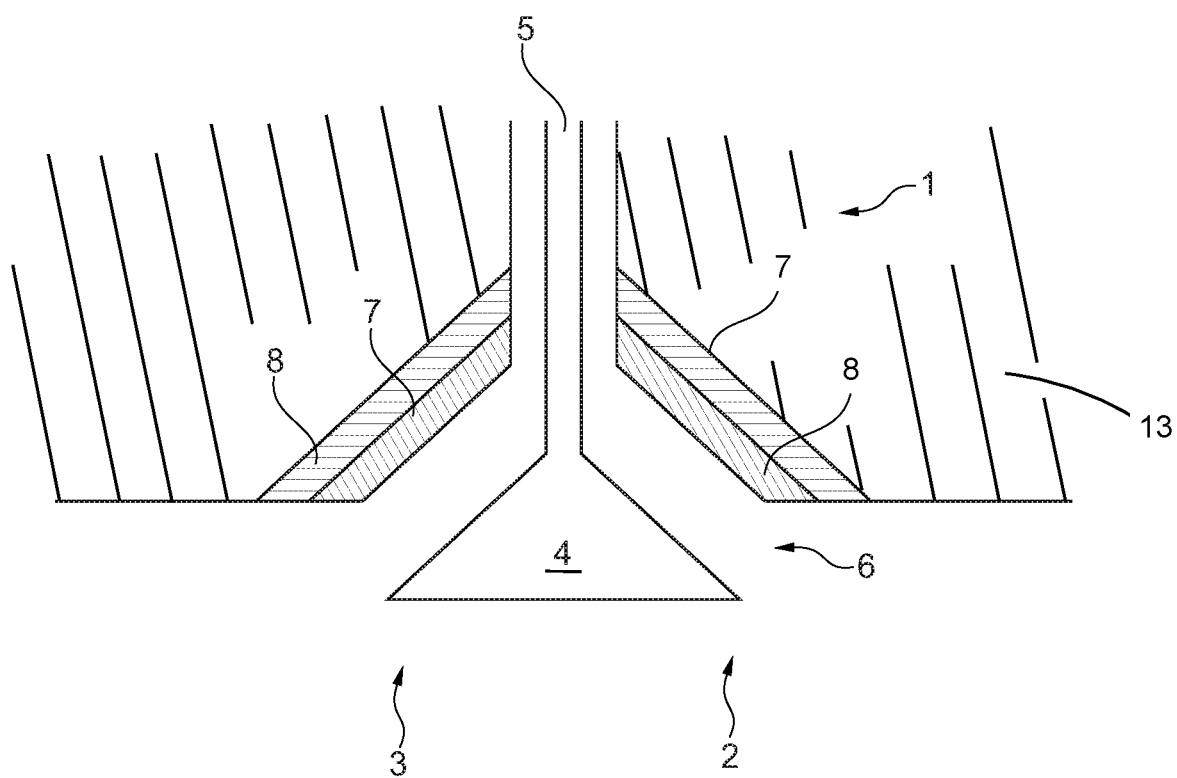
FIG. 1 shows a cross-section of a valve region of a cylinder head.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1, a valve region 2 of a cylinder head 1 formed from a substrate material 13 is illustrated. In one variation of the present disclosure, the valve 3 is an inlet valve. In another variation the valve 3 is an exhaust valve. As is conventional, the valve 3 has a valve head 4 and a valve stem 5. The valve 3 is driven via the valve stem 5, e.g. by a camshaft (not shown). This has the effect that the valve head 4 is temporarily in the open position of the valve 3 as shown in FIG. 1, in which it is lowered (relative to the valve seat region 6 shown in the figure) or separated from the valve seat region 6. The valve 3 is then open and gases can flow through the gap between the valve head 4 and the valve seat region 6. If the valve 3 is moved upward, the valve head 4 comes into contact with the valve seat region 6, inhibiting any more gases to flow through or between the valve head 4 and the valve seat region 6, i.e., the valve 3 is closed.

In modern internal combustion engines, the high speeds of such engines mean that the valve 3 must be opened and closed quickly in a manner corresponding thereto. This, in turn, has the effect that a very large number of hard impacts of the valve head 4 on the valve seat region 6 occurs over the life of the internal combustion engine.

To enable a service life sufficient for an internal combustion engine to be achieved, it is therefore desired to use sufficiently durable materials. In the case of the valve 3 itself, it is relatively unproblematic, owing to the small volume thereof, to manufacture the valve 3 (substantially) completely from a particularly hard material.

Although it is possible, in principle, in the case of the cylinder head 1, to manufacture the entire cylinder head 1 from a hard material, this makes little sense for economic reasons. For, of course, this would mean that a very large volume of material consisting of an expensive hard material would have to be produced to provide sufficient hardness in the relatively small valve seat region 6 (and, where applicable, also other valve seat regions, bearing regions for a crankshaft or the like). Moreover, economic problems emerge not only in respect of the fact that the cylinder head 1 would have to be manufactured from a relatively expensive material. On the contrary, problems also emerge in respect of the fact that the cylinder head 1 would be significantly heavier as a result and furthermore that the machining thereof would necessarily turn out to be more expensive, which is likewise a disadvantage.

In the case of the cylinder head 1, recourse is therefore had to the alternative solution of providing a hard material only in the valve seat region 6. In terms of area, this region is typically selected in such a way that it corresponds to the contact surface with the valve head 4 (or small margins are provided). In the present case, the valve seat region 6 of the cylinder head 1 with two different material layers 7, 8, namely a first material layer 7 and a second material layer 8 is provided. Thus, the valve seat region 6 is also referred to here as a coated surface region 6. The first material layer 7 is arranged directly on the substrate material 13 of the cylinder head 1. The second material layer 8 is situated on the first material layer 7. Thus, the first material layer 7 is arranged in such a way as to lie between the substrate material 13 of the cylinder head 1 and the second material layer 8.

The second material layer 8 is situated on one side, in contact with the first material layer 7; the surface facing away therefrom forms the contact surface with the surface region of the valve head 4 which corresponds thereto.

The material layers 7, 8 are deposited by a method referred to in the technical jargon as "laser cladding" (cf. also FIG. 2 and the associated description). By virtue of the process involved, this deposition welding method leads to certain transitional regions 15, 16 between the substrate material 13 of the cylinder head 1 and the material of the first material layer 7, and between the material of the first material layer 7 and the material of the second material layer 8. Although these regions are not shown in FIG. 1 for reasons of clarity, they are indicated schematically in FIG. 2, of which more specific details will be given below.

The advantage of the arrangement shown in FIG. 1 is that, by virtue of the first material layer 7, the second material layer 8 can be better improved to its function as a particularly hard layer.

In one form of the present disclosure, carbides (especially also carbides in particle form) are included in the second material layer 8 in order to provide a particularly high impact resistance of the second material layer 8. By virtue of the first material layer 7, which serves to a certain extent as a transitional layer or adhesion-promoting layer between the second material layer 8 and the material block 1, there are less pronounced material incompatibilities between the material of the second material layer 8 and the substrate material 13 of the cylinder head 1 (if any).

The first material layer 7 is improved to adhere well to the substrate material 13 of the material block 1 and to the material of the second material layer 8, that is to say it can be referred to as an adhesion-promoting layer. Even if it is not disadvantageous if the first material layer 7 has a certain hardness (in particular an increased hardness relative to the substrate material 13 of the cylinder head 1), this is not necessarily desired since the hardness functionality is of course provided by the second material layer 8.

In one form of the present disclosure, the substrate material 13 of the cylinder head 1 is an aluminum alloy containing, in weight % (wt. %), about 9% of silicon. The material of the first material layer 7 is a first aluminum alloy containing about 12% of silicon. Thus, the first material layer 7 already has an increased hardness as compared with the substrate material 13 of the cylinder head 1. The second material layer 8, in turn, is composed of a second aluminum alloy, likewise with a proportion of silicon of about 12%, but carbide particles, in particular niobium carbide, boron carbide, silicon carbide, vanadium carbide, tungsten carbide— which comprises both fused tungsten carbides, including spheroidized fused tungsten carbides and tungsten monocarbide or WC/Co- and WC/Ni-based hard metal composites, wherein the carbide particles do not tend to dissolve in aluminum melts to form embrittling aluminum carbides— are additionally included in the aluminum alloy, which as it were serves as a kind of fixing matrix. These particles significantly increase the hardness of the second material layer 8. In another form, the second material layer 8 is a second aluminum alloy with an increased proportion of silicon and the proportion of silicon is between about 40% and about 50%, for example between about 41% and about 48%. In one form, the proportion of silicon is about 42%. The increased portion of silicon exerts a material-hardening effect and in some aspects is admixed with the second aluminum alloy of the second material layer 8. That is, additional silicon is admixed with the second aluminum alloy. Accordingly, and by virtue of the first aluminum alloy of the first material layer 7, there are less pronounced material incompatibilities between the second aluminum alloy of the second material layer 8 (with carbides and/or additional silicon) and the aluminum alloy of the cylinder head 1.

Figure 2A:
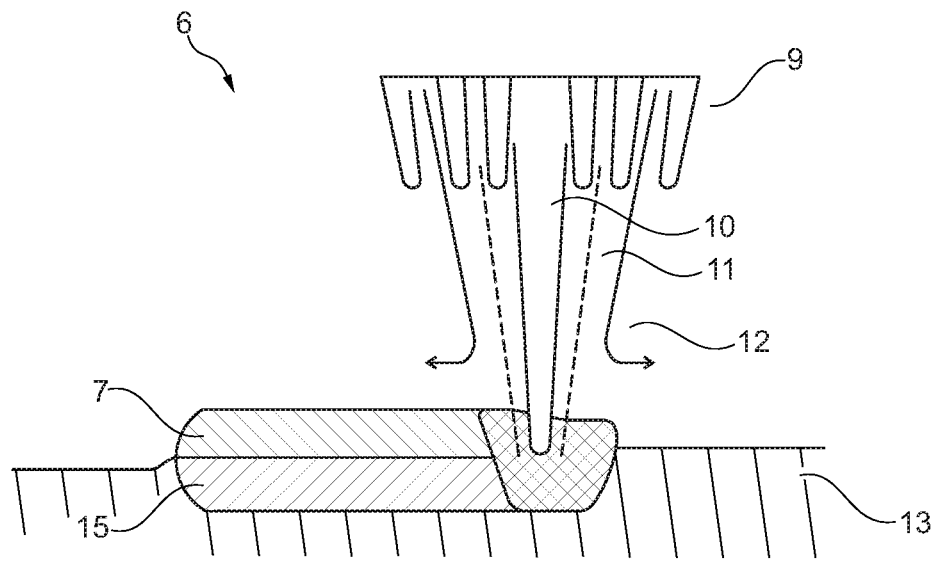
FIG. 2 shows a method for forming two layers situated one on top of the other by a laser cladding method with FIG. 2a showing forming of a first layer and FIG. 2b showing forming of a second layer.
Figure 2B:
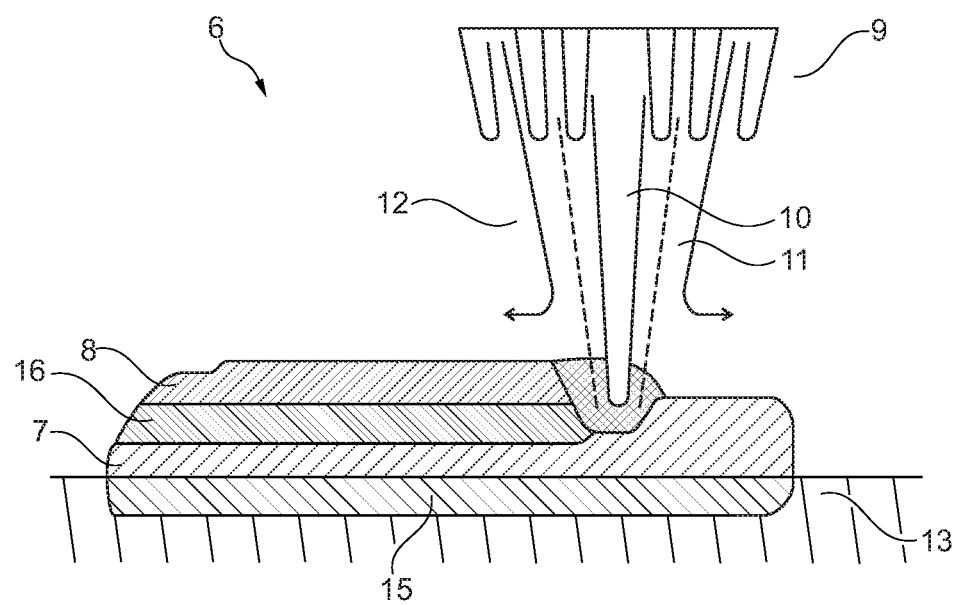

FIG. 2 illustrates schematically how the valve seat region 6 of the cylinder head 1 can be formed in the form of two successive process steps (FIG. 2a and FIG. 2b). Purely for the sake of completeness, attention is drawn to the fact that the process steps can of course also be used for other surface regions and/or for other workpieces, wherein preparation of the substrate material is carried out before the first layer is deposited.

FIG. 2a shows schematically the deposition of material of a first material layer 7 in the course of a laser deposition welding method, referred to as a "laser cladding method". A processing head 9 is used to carry out the laser cladding method. The processing head 9 has a plurality of discharge openings, in the present case arranged substantially concentrically with respect to one another. In one form, the processing head 9 has a discharge opening for a laser beam 10, through which a shielding gas is also fed in, and one annular discharge opening or a plurality of discharge openings for a powder stream 11. Optionally, the processing head 9 also has one or more discharge openings for a shielding gas 12, which is fed in the form of an enveloping gas flow.

The laser beam 10 is used to spot-melt the substrate material 13 (in FIG. 2a) by an appropriate energy input. Purely for the sake of completeness, attention is drawn to the fact that a typically oscillating and/or alternating movement of the processing head 9 is desired to form an extended material layer 7, 8. In addition, the material, which is in the present case fed in the form of powder particles 11, is melted by the laser beam 10. It should be understood that feeding the material in some other way, e.g. in the form of a wire, is likewise possible in addition or as an alternative.

Accordingly, a molten pool 14 is formed locally, said pool consisting partially of the substrate material 13 and partially of the material of the powder stream 11 (the precise proportions depend, in particular, on the material composition of the powder stream 11 and on the feed rate of the powder stream 11). Nevertheless, owing to the method selected, it is not desirable to deposit a material that is completely different from the substrate material 13 as a first material layer 7. To prevent the occurrence of oxidation effects in the molten pool 14, a shielding gas 12 is fed in via another discharge opening of the processing head 9, wherein the shielding gas 12 is an inert gas (e.g. argon).

As soon as the molten pool 14 has cooled down again owing to the forward movement of the processing head 9 (left-to-right with respect to the figures), the first solid material layer 7 forms, said layer having a different material composition from the substrate material 13. For the sake of completeness, attention is drawn to the fact that, owing to the process, a first material layer 7 with a material composition that is completely homogeneous within the layer is not obtained. On the contrary, a first transitional layer 15, which is illustrated schematically in FIG. 2a, is formed between the first material layer 7 and the substrate material 13. However, attention is drawn to the fact that the first transitional layer 15 is not depicted to scale (typically, it is significantly thinner). Moreover, the first transitional layer 15 is likewise not an inherently homogeneous layer; instead, in the drawing this symbolizes a "continuous material transition" between the substrate material 13 and the material of the first material layer 7.

As soon as the first material layer 7 has been fully formed by a corresponding movement of the processing head 9, the deposition of a second material layer 8 in accordance with FIG. 2b may be started. For this purpose, it is possible, as one alternative, to use the same processing head 9, wherein the powder stream 11 is typically replaced by a powder stream with a material composition that has been modified as compared with FIG. 2a (e.g., with addition of carbide(s) and/or silicon). However, it is likewise possible to use a separate processing head for this purpose, for example, a separate processing head with a similar or substantially similar construction. It is also possible for the separate processing head to follow the first, and it would therefore be possible to deposit the two layers in succession.

As can be seen from FIG. 2b, the second material layer 8 is formed on the first material layer 7, likewise by a laser cladding method. Here too, in a manner similar to the first method step shown in FIG. 2a, a second transitional layer 16 is formed between the first material layer 7 and the second material layer 8. Avoiding repetition, attention is drawn to what has already been stated above, especially to what has been stated in relation to the carrying out the method in accordance with FIG. 2a.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aluminum alloy cylinder head of an internal combustion engine, the cylinder head comprising:
   at least one coated valve seat region formed by a local thermal deposition welding method, wherein the at least one coated valve seat region has a first layer and a second layer, wherein the second layer is arranged on the first layer, and the first layer is formed from a first aluminum alloy that is different than the aluminum alloy of the cylinder head and the second layer is formed from a second aluminum alloy that is different than the first aluminum alloy, wherein the second aluminum alloy of the second layer exerts a material-hardening effect.

2. The cylinder head according to claim 1, wherein the first layer and the second layer are laser clad layers.

3. The cylinder head according to claim 1, wherein the aluminum alloy of the cylinder head contains silicon.

4. The cylinder head according to claim 3, wherein the aluminum alloy of the cylinder head contains about 9 wt. % silicon.

5. The cylinder head according to claim 1, wherein the first aluminum alloy contains more silicon than the aluminum alloy of the cylinder head.

6. The cylinder head according to claim 5, wherein the first aluminum alloy contains more than about 9 wt. % silicon.

7. The cylinder head according to claim 6, wherein the first aluminum alloy contains about 12 wt. % silicon.

8. The cylinder head according to claim 1, wherein the second aluminum alloy contains at least one material that exerts the material hardening effect selected from the group consisting of niobium carbide, boron carbide, silicon carbide, vanadium carbide, tungsten carbide, fused tungsten carbides, spheroidized fused tungsten carbides and tungsten monocarbide, WC/Co-based hard metal composites and WC/Ni-based hard metal composites.

9. The cylinder head according to claim 1, wherein the second aluminum alloy contains between about 40% and about 50% silicon and the silicon between about 40% and about 50% exerts the material hardening effect.

10. The cylinder head according to claim 9, wherein the second aluminum alloy contains between about 41% and about 48% silicon.

11. The cylinder head according to claim 10, wherein the second aluminum alloy contains about 42% silicon.

12. The cylinder head according to claim 1, wherein at least one of the first layer and the second layer has a material thickness of between about 200 µm and about 1000 µm.

13. The cylinder head according to claim 12, wherein at least one of the first layer and the second layer has a material thickness of between about 300 µm and about 800 µm.

14. The cylinder head according to claim 13, wherein at least one of the first layer and the second layer has a material thickness of between about 400 µm and about 600 µm.

15. The cylinder head according to claim 1, wherein the first layer is an adhesion-promoting layer between the substrate material and the second layer.

16. An internal combustion engine comprising:
   a cylinder head formed from an aluminum alloy and with at least one coated valve seat region formed by a local thermal deposition welding method, wherein the at least one coated valve seat region has a first layer and a second layer, wherein the second layer is arranged on the first layer, and the first layer is formed from a first aluminum alloy that is different than the aluminum alloy of the cylinder head and the second layer is formed from a second aluminum alloy that is different than the first aluminum alloy, wherein the second aluminum alloy of the second layer exerts a material-hardening effect.

17. The internal combustion engine according to claim 16, wherein the first layer is formed from an aluminum alloy with an increased proportion of silicon in relation to the aluminum alloy of the cylinder head.

18. The internal combustion engine according to claim 17, wherein the first aluminum alloy contains more than about 9 wt. % silicon.

19. The internal combustion engine according to claim 18, wherein the second aluminum alloy has an increased proportion of silicon than the aluminum alloy of the cylinder head and at least one of niobium carbide, boron carbide, silicon carbide, vanadium carbide, tungsten carbide, also including fused tungsten carbides, both spheroidized tungsten carbides and tungsten monocarbide or WC/Co- or WC/Ni-based hard metal composites.

20. The internal combustion engine according to claim 18, wherein the second aluminum alloy contains between about 40% and about 50% silicon and the silicon between about 40% and about 50% exerts the material hardening effect.

* * * * *